(12) United States Patent
MacFarlane

(10) Patent No.: US 9,328,667 B2
(45) Date of Patent: May 3, 2016

(54) SYSTEMS AND METHODS FOR CHANGING A SPEED OF A COMPRESSOR BOOST STAGE IN A GAS TURBINE

(71) Applicant: PRATT & WHITNEY CANADA CORP., Longueuil (CA)

(72) Inventor: Ian A. MacFarlane, St. Bruno (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 14/744,323

(22) Filed: Jun. 19, 2015

(65) Prior Publication Data

US 2015/0285156 A1    Oct. 8, 2015

Related U.S. Application Data

(62) Division of application No. 13/306,095, filed on Nov. 29, 2011, now Pat. No. 9,091,216.

(51) Int. Cl.
  *F02C 1/06* (2006.01)
  *F02C 7/36* (2006.01)
  *F23R 3/26* (2006.01)

(52) U.S. Cl.
  CPC ...... *F02C 7/36* (2013.01); *F23R 3/26* (2013.01)

(58) Field of Classification Search
  CPC .............. F02C 7/36; F02C 3/113; F02C 7/32; F05B 2260/4023; F23R 3/26
  See application file for complete search history.

(56) References Cited

U.S. PATENT DOCUMENTS

| | | | |
|---|---|---|---|
| 2,608,054 A | 8/1952 | Price | |
| 3,093,968 A | 6/1963 | Osofsky | |
| 3,100,378 A | 8/1963 | Austin et al. | |
| 3,145,532 A | 8/1964 | Moss | |
| RE25,907 E | 11/1965 | Wickman | |
| 3,290,878 A | 12/1966 | Wickman | |
| 3,514,945 A | 6/1970 | Austin | |
| 3,831,373 A | 8/1974 | Flynt | |
| 3,851,463 A | 12/1974 | Robinson | |
| 3,997,283 A * | 12/1976 | Kronogard | 417/405 |
| 4,369,630 A | 1/1983 | Bloomfield | |
| 4,542,722 A | 9/1985 | Reynolds | |
| 4,864,812 A | 9/1989 | Rodgers et al. | |
| 4,871,296 A | 10/1989 | Laessle et al. | |
| 4,876,849 A * | 10/1989 | Klingels | 60/792 |
| 5,694,765 A | 12/1997 | Hield et al. | |
| 5,778,675 A | 7/1998 | Nakhamkin | |
| 7,246,482 B2 | 7/2007 | Mahoney et al. | |
| 7,490,594 B2 | 2/2009 | Van Dyne et al. | |
| 7,543,439 B2 | 6/2009 | Butt et al. | |
| 7,805,947 B2 | 10/2010 | Moulebhar | |
| 7,823,391 B2 | 11/2010 | Beardsley | |
| 8,887,485 B2 * | 11/2014 | Ress, Jr. | 60/226.1 |
| 2009/0199567 A1 | 8/2009 | Gockel et al. | |
| 2009/0288421 A1 | 11/2009 | Zeiner et al. | |
| 2009/0293445 A1 | 12/2009 | Ress, Jr. | |
| 2010/0199666 A1 | 8/2010 | VanDyne et al. | |
| 2010/0300117 A1 | 12/2010 | Moulebhar | |

* cited by examiner

*Primary Examiner* — Gerald L Sung

(74) *Attorney, Agent, or Firm* — Norton Rose Fulbright Canada, LLP

(57) ABSTRACT

Systems and methods for changing a speed ratio between a compressor boost stage (12) and at least one power turbine (16) of a gas turbine engine (10) are described. Such a system may comprise a coupling device (20) configured to selectively transmit energy from the at least one power turbine (16) to the boost stage (12) according to at least a first speed ratio and a second speed ratio. The system may also comprise an auxiliary power device (22, 26) configured to cause a rotational speed of the boost stage (12) to change from a first speed corresponding substantially to the first speed ratio to a second speed corresponding substantially to the second speed ratio when the boost stage (12) is decoupled from the at least one power turbine (16).

6 Claims, 4 Drawing Sheets

SYSTEMS AND METHODS FOR CHANGING A SPEED OF A COMPRESSOR BOOST STAGE IN A GAS TURBINE

CROSS-REFERENCE TO RELATED APPLICATION

The present application is a divisional of U.S. patent application Ser. No. 13/306,095 filed on Nov. 29, 2011, the entire contents of which are incorporated herein by reference.

TECHNICAL FIELD

The disclosure relates generally to gas turbine engines, and more particularly to changing a speed of a compressor boost stage in a gas turbine engine.

BACKGROUND OF THE ART

Compressor boost stages are commonly utilized to increase an overall pressure ratio in gas turbine engines. A compressor boost stage pressurizes the air upstream of a core section of an engine and is typically part of a low pressure spool of the engine driven by at least one low pressure turbine. The coupling between the boost stage and the low pressure spool is typically at a fixed speed ratio such that the rotational speed of the boost stage may only be varied by varying the rotational speed of the low pressure spool. Hence, the fixed speed ratio between the boost stage and the low pressure spool limits the ability to vary the overall pressure ratio during operation of the engine.

Improvement in driving of compressor boost stages in gas turbine engines is therefore desirable.

SUMMARY

In various aspects, for example, the disclosure describes systems, devices and methods for changing a speed of a compressor boost stage in a gas turbine engine.

Thus, in one aspect, the disclosure describes systems for changing a speed ratio between a compressor boost stage and at least one power turbine of a gas turbine engine during operation. Such systems may comprise: a coupling device configured to: selectively transmit energy from the at least one power turbine to the boost stage according to at least a first speed ratio and a second speed ratio, and to selectively decouple the boost stage from the at least one power turbine and re-couple the boost stage to the at least one power turbine for transitioning between the first speed ratio and the second speed ratio; and an auxiliary power device configured to cause a rotational speed of the boost stage to change from a first speed corresponding substantially to the first speed ratio to a second speed corresponding substantially to the second speed ratio when the boost stage is decoupled from the power turbine.

In another aspect, the disclosure describes gas turbine engines. Such gas turbine engines may comprise: a compressor boost stage, a core section and at least one power turbine in serial flow communication; a coupling device configured to: selectively couple at least one rotor of the boost stage to the at least one power turbine at at least a first speed ratio and a second speed ratio, and to selectively decouple the rotor from the at least one power turbine to permit a change in rotational speed of the rotor relative to the at least one power turbine and re-couple the rotor to the power turbine; and an auxiliary power device configured to cause the rotational speed of the rotor of the boost stage to change from a first speed corresponding substantially to the first speed ratio to a second speed corresponding substantially to the second speed ratio when the rotor of the boost stage is decoupled from the power turbine.

In a further aspect, the disclosure describes methods for changing a rotational speed of a compressor boost stage driven by at least one power turbine of a gas turbine engine relative to a speed of the at least one power turbine. Such methods may comprise: driving the boost stage at a first rotational speed corresponding to a first speed ratio between the boost stage and the at least one power turbine via coupling between the boost stage and the at least one power turbine; decoupling the boost stage from the at least one power turbine; changing the rotational speed of the boost stage from the first rotational speed to a second rotational speed substantially corresponding to a second speed ratio between the boost stage and the at least one power turbine; re-coupling the boost stage to the at least one power turbine at the second speed ratio; and driving the boost stage at the second rotational speed via coupling between the boost stage and the at least one power turbine.

Further details of these and other aspects of the subject matter of this application will be apparent from the detailed description and drawings included below.

DESCRIPTION OF THE DRAWINGS

Reference is now made to the accompanying drawings, in which.

DETAILED DESCRIPTION

Aspects of various embodiments are described through reference to the drawings.

Figure 1:
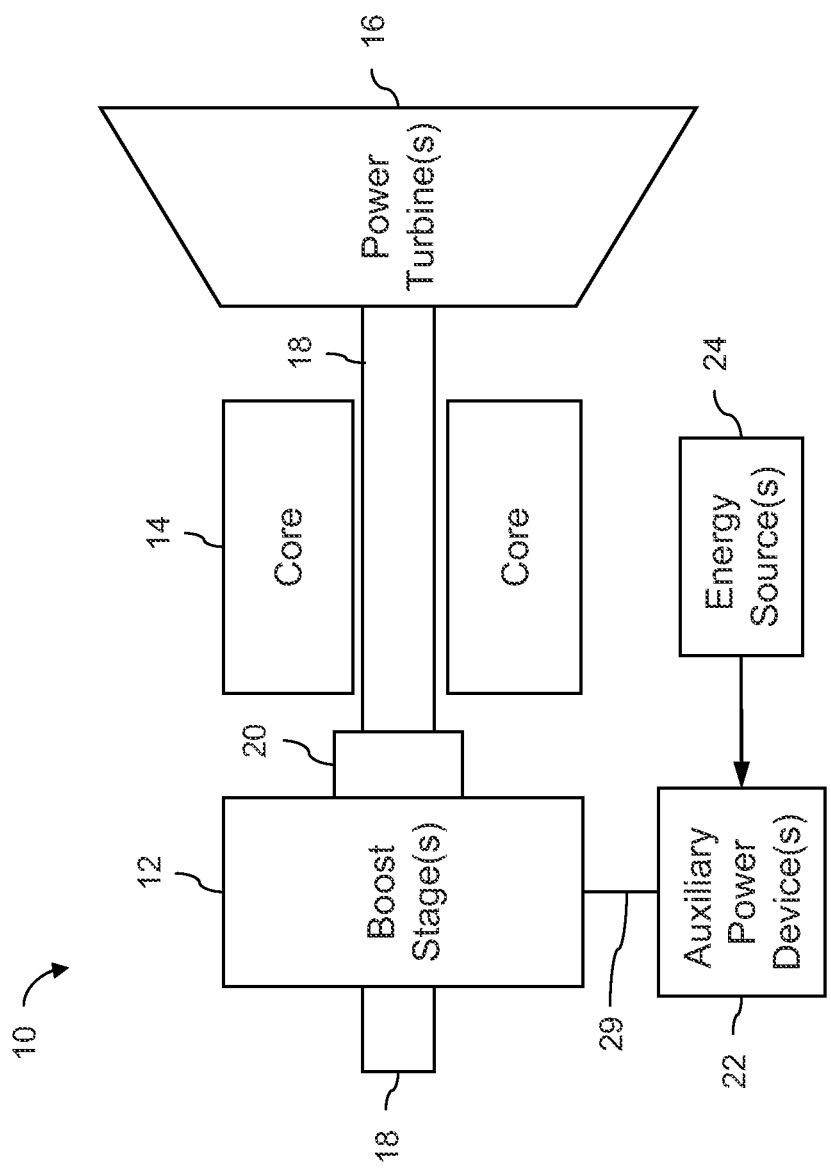
FIG. 1 is a schematic illustration of an axial cross-section of a gas turbine engine.

FIG. 1 schematically illustrates a gas turbine engine 10 of a type which may be provided for use in subsonic flight, generally comprising, in serial flow communication, compressor boost stage(s) 12, which may include one or more compressor rotors/disks for pressurizing air; core section(s) 14; and power turbine(s) 16. Core section(s) 14 may include one or more compression stage(s), one or more combustors in which compressed air is mixed with fuel and ignited for generating an annular stream of hot combustion gases, and one or more high pressure turbines. The one or more power turbine(s) 16 may be configured to extract energy from the combustion gases exiting the core section(s) 14. Turbine engine 10 may be suitable for use in an aircraft application and may, for example, be configured as a turboshaft, turbofan or turboprop type of engine. Power turbine shaft(s) 18 may, for example, be used to power a helicopter main rotor, a propeller of a fixed-wing aircraft, or a fan of a turbofan engine. Alternatively, turbine engine 10 may be used for ground-based industrial applications such as for power generation.

An engine 10 may have a dual spool configuration but one skilled in the relevant arts will appreciate that engine 10 may not be limited to such configuration. For example, engine 10 may comprise a high pressure spool comprising core section(s) 14 and a low pressure spool comprising power turbine(s) 16 and boost stage(s) 12. Accordingly, power turbine(s) 16 may transmit energy to boost stage(s) 12 via power turbine shaft(s) 18. Core section(s) 14 may comprise its own shaft(s) disposed coaxially with power turbine shaft(s) 18 and may not be mechanically coupled to power turbine shaft(s) 18. For example, power turbine shaft(s) 18 may rotate in one direction (e.g. clockwise) at one rotational speed during operation while core section(s) 14 rotate(s) in an opposite direction (e.g. counter-clockwise) and at a different rotational speed.

Engine 10 may be configured to permit a rotational speed of boost stage(s) 12 to be changed in relation to a rotational speed of power turbine(s) 16. Accordingly, engine 10 may comprise a system for changing a speed ratio between boost stage(s) 12 and power turbine(s) 16 during operation of engine 10. Such system may comprise one or more coupling devices 20 configured to transmit energy from power turbine(s) 16 to boost stage(s) 12 via power turbine shaft(s) 18 according to at least a first speed ratio and a second speed ratio different from the first speed ratio. Coupling device(s) 20 may be configured to selectively mechanically couple and decouple boost stage(s) 12 from power turbine(s) 16 of engine 10. For example, decoupling of boost stage(s) 12 from power turbine(s) 16 may be done at the beginning of a transition period during which the rotational speed of boost stage(s) 12 is either increased or decreased relative to the rotational speed of power turbine(s) 16. Coupling device(s) 20 may then re-couple boost stage(s) 12 to power turbine(s) 16 of engine 10 at the new speed ratio.

Auxiliary power device(s) 22 may be configured to cause the rotational speed of boost stage(s) 112 to change relative to power turbine(s) 16 while boost stage(s) 12 is decoupled from power turbine(s) 16. Auxiliary power device(s) 22 may be used to transmit energy to boost stage(s) 12 during the transition period to cause a rotational speed of boost stage(s) 12 to increase. For example, auxiliary power device(s) 22 may be configured to transmit energy from energy source(s) 24 to boost stage(s) 12. Auxiliary power device(s) 22 may also be configured to cause a decrease of the rotational speed of boost stage(s) 12 during the transition period by, for example, causing braking of boost stage(s) 12 and/or otherwise withdraw energy from boost stage(s) 12.

Auxiliary power device(s) 22 may comprise one or more energy transmission devices such as, for example, one or more air turbine(s), electric motor(s)/generator(s) and/or hydraulic motor(s) adapted to provide energy through the application of torque or other forms of force to boost stage(s) 12 and/or components thereof, including for example pressurized air or other fluid impact on one or more blades of boost stage(s) 12. Accordingly, energy source(s) 24 may comprise, for example, one or more sources of pressurized fluid such as air or hydraulic fluid and/or one or more sources of electrical energy such as one or more batteries and/or one or more generator(s). Such generator(s) may be driven by engine 10, an auxiliary power unit (APU), ram air turbine or other source(s) of motive power. For an aircraft application for example, energy source(s) 24 may be located on-board the aircraft.

Figure 2A:
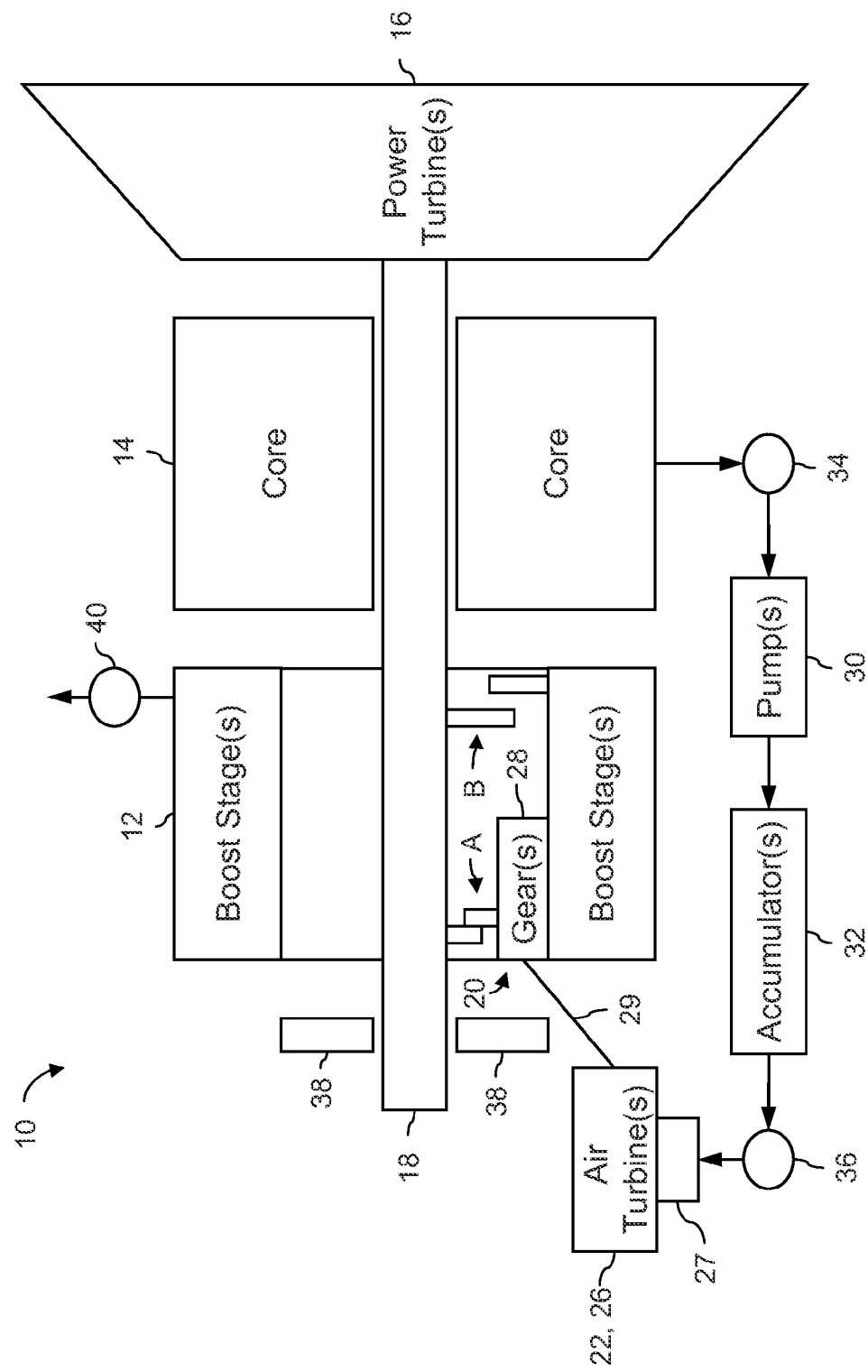
FIG. 2A is a schematic illustration of an axial cross-section of a gas turbine engine showing a boost stage coupled to a low pressure spool of the engine at a first speed ratio.
Figure 2B:
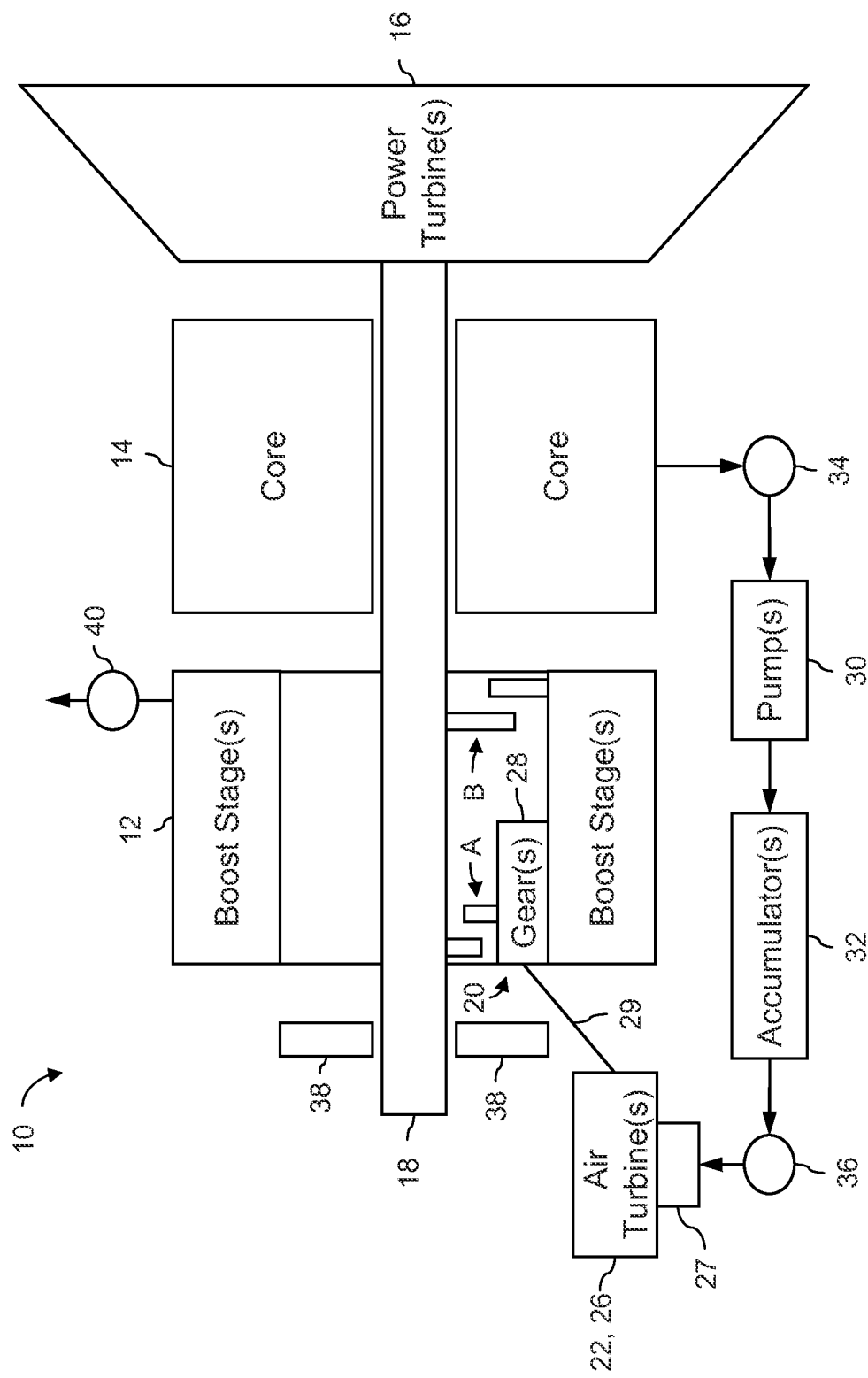
FIG. 2B is a schematic illustration of the engine of FIG. 2A showing the boost stage being decoupled from the low pressure spool of the engine.
Figure 2C:
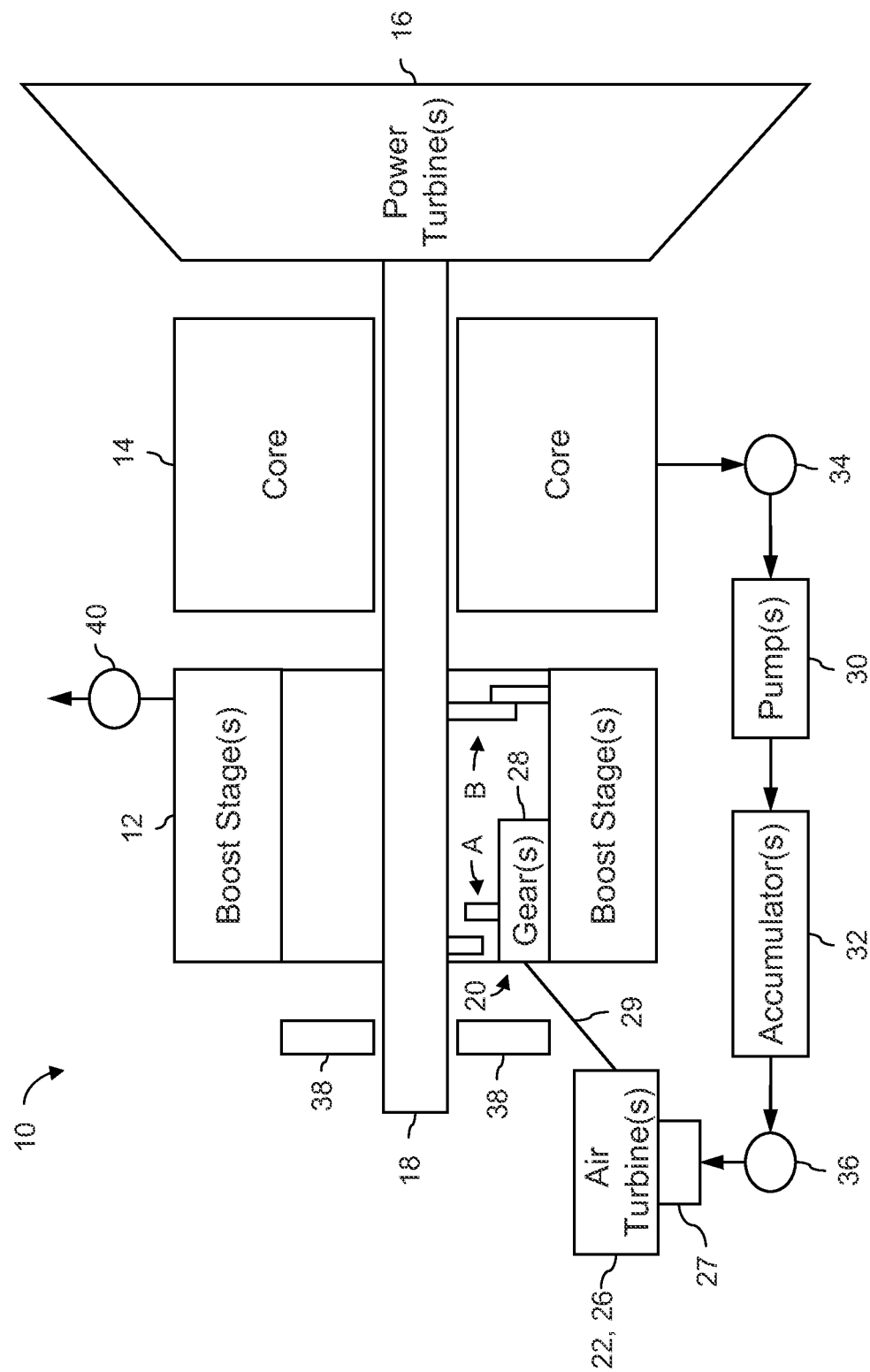
FIG. 2C is a schematic illustration of the engine of FIG. 2A showing the boost stage being coupled to the low pressure spool of the engine at a second speed ratio.

FIGS. 2A-2C schematically illustrate an exemplary representation of a gas turbine engine 10, wherein auxiliary power device(s) 22 may include air turbine(s) 26 and coupling device(s) 20 may include clutch A, clutch B and gear(s) 28. Air turbine(s) 26 may each comprise variable inlet nozzle(s) 27. Air turbine(s) 26 may, for example, be coupled to boost stage(s) 12 via shaft(s) 29 and gear(s) 28. The coupling of air turbine(s) 26 to boost stage(s) 12 may be selectable and may be done as required. Air turbine(s) 26 may, for example, be of radial or axial type, and may be driven using pressurized air. Air turbine(s) 26 may be of a same or similar type as those typically used in air-start systems for turbine engines.

Energy source(s) 24 (shown in FIG. 1) may include pressurized air extracted from core section(s) 14. Such pressurized air may, for example, be extracted from a high pressure compressor section upstream of a combustor of core section(s) 14. Engine 10 may further comprise one or more each of pump(s) 30, accumulator(s) 32 and/or valves 34 and 36. Pump(s) 30 may be used if desired or required to further increase pressure of the air extracted from core section(s) 14 prior to being used to drive air turbine(s) 26. Accumulator(s) 32 may be used if desired or required to store an amount of pressurized air prior to being used to drive air turbine(s) 26. Valve(s) 34 may be used to control an amount of pressurized air being extracted from core section(s) 14. Valve(s) 36 may be used to control an amount of air being delivered to air turbine(s) 26 from accumulator(s) 32 when the rotational speed of boost stage(s) 12 is increased.

Engine 10 may also comprise inlet guide vanes 38 upstream of boost stage(s) 12 and bleed valve(s) 40 for extracting compressed air from boost stage(s) 12. Inlet guide vanes 38 may be adjustable. Bleed valve(s) 40 may be used to supply compressed air to accessories associated with or powered by engine 10 or, for example, an environmental control system (ECS) of an aircraft to which engine 10 may be mounted. Alternatively, bleed valve(s) 40 may be used to bleed air from boost stage(s) 12 into the environment under appropriate conditions.

During operation, a system according to the disclosure may be used to change a rotational speed of compressor boost stage(s) 12 relative to a rotational speed of power turbine(s) 16 during operation of engine 10. In an aircraft application, it may be desirable to operate boost stage(s) 12 at different rotational speeds during different phases of flight or under different conditions. For example, a higher rotational speed of boost stage(s) 12 may be desired during take-off to obtain a higher pressure ratio when a relatively large amount of thrust and/or power is required from engine 10. Alternatively, it may be desirable and more efficient to operate boost stage(s) 12 at a lower rotational speed during cruise to obtain a lower pressure ratio when a lower amount of thrust and/or power is required from engine 10. Accordingly, the system described above may be used to change a speed ratio between boost stage(s) 12 and power turbine(s) 16 during operation of engine 10.

At a particular phase of operation (e.g. flight), such as during cruise for example, boost stage(s) 12 may be driven at a first speed by mechanically transferring energy from power turbine(s) 16 to boost stage(s) 12 according to a first speed ratio via power turbine shaft(s) 18, clutch A and gear(s) 28 (see FIG. 2A). Gear(s) 28 may, for example, be of speed-reducing type such that a rotational speed of boost stage(s) 12 may be lower that a rotational speed of power turbine shaft(s) 18. During this phase, boost stage(s) 12 may, for example, operate at a rotational speed of 11,000 rpm while power turbine shaft(s) 18 may operate at a rotational speed of 22,000 rpm.

Conditioned upon an increase in rotational speed of boost stage(s) 12 in relation to power turbine(s) 16 being necessary or desired, such as in response to a demand for increased thrust and/or power from engine 10 for example, an increase in rotational speed of boost stage(s) 12 relative to power turbine(s) 16 may be initiated. The speed increase of boost stage(s) 12 may be achieved over a transition period during which boost stage(s) 12 may be temporarily decoupled from power turbine shaft(s) 18. The decoupling of boost stage(s) 12 from power turbine shaft(s) 18 may, for example, be achieved by releasing clutch A while clutch B may already be released (see FIG. 2B).

In order to increase the rotational speed of boost stage(s) 12, auxiliary power device(s) 22, 26 may be used to transfer energy to boost stage(s) 12 to increase the rotational speed of boost stage(s) 12 from a first speed to a second speed while boost stage(s) 12 may be temporarily decoupled from power turbine shaft(s) 18. Energy transfer from auxiliary power device(s) 22, 26 to boost stage(s) 12 may be done mechanically via shaft(s) 29 and gear(s) 28. Air turbine(s) 26 may transfer energy from core section(s) 14 to boost stage(s) 12. Accordingly, pressurized air may be extracted from core section(s) 14 and used to drive air turbine(s) 26. The amount of pressurized air extracted from core section(s) 14 may be controlled via valve(s) 34. Pump(s) 30 may be used if necessary or desired to further pressurize the air prior to driving air turbine(s) 26. Accumulator(s) 32 may also be used to store some pressurized air prior to driving air turbine(s) 26.

Once boost stage(s) 12 has reached the second (i.e. increased) speed, which may substantially correspond to a second speed ratio available via clutch B, boost stage(s) 12 may be re-coupled to power turbine shaft(s) 18 via clutch B and the driving of boost stage(s) 12 via power turbine(s) 16 may be resumed (see FIG. 2C). Clutch B may be configured to mechanically couple boost stage(s) 12 directly to power turbine shaft(s) 18 at a one to one speed ratio. For example, when clutch B is engaged, clutch A may be disengaged and both boost stage(s) 12 and power turbine(s) 16 may be operating at a rotational speed of 22,000 rpm.

The system described above may also be used to decrease the rotational speed of boost stage(s) 12 relative to power turbine(s) 16. For example, while boost stage(s) 12 may be driven via clutch B (see FIG. 2C) at a relatively high rotational speed under appropriate conditions and conditioned upon a decrease in rotational speed of boost stage(s) 12 relative to power turbine(s) 16 being necessary or desired, a decrease in rotational speed of boost stage(s) 12 may be initiated. Similarly to the procedure described above, the speed decrease of boost stage(s) 12 relative to power turbine(s) 16 may be achieved over a transition period during which boost stage(s) 12 may be temporarily decoupled from power turbine shaft(s) 18. The decoupling of boost stage(s) 12 from power turbine shaft(s) 18 may be achieved, for example, by releasing clutch B while clutch A may already be released (see FIG. 2B).

In order to decrease the rotational speed of boost stage(s) 12, auxiliary power device(s) 22, 26 may be used to cause braking of boost stage(s) 12 or otherwise withdraw energy from boost stage(s) 12 to decrease the rotational speed of boost stage(s) 12 from a first speed to a second speed while boost stage(s) 12 may be temporarily decoupled from power turbine shaft(s) 18. Braking may be achieved by using boost stage(s) 12 to drive air turbine(s) 26 via shaft(s) 29 while the inlet flow and pressure to air turbine(s) 26 is controlled by adjusting variable inlet nozzle(s) 27 and consequently adjusting a resistance applied to boost stage(s) 12 by air turbine(s) 26. Auxiliary power device(s) 22 may include other braking means suitable for decreasing the rotational speed of boost stage(s) 12.

Once boost stage(s) 12 has reached the second (i.e. reduced) speed, which may substantially correspond to a second speed ratio available via clutch A, boost stage(s) 12 may be re-coupled to power turbine shaft(s) 18 via clutch A and gear(s) 28 and the driving of boost stage(s) 12 via power turbine(s) 16 may be resumed (see FIG. 2A). As explained above, clutch A may be configured to mechanically couple boost stage(s) 12 to power turbine(s) 16 via gear(s) 28 and thereby allow boost stage(s) to rotate at a lower speed in comparison with mechanical coupling via clutch B.

During the speed transition of boost stage(s) 12 between the first speed and the second speed (whether increased or reduced), inlet guide vanes 38 and/or bleed valve(s) 40 may be adjusted to control (i.e. increase or decrease) a resistance on boost stage(s) 12 and thereby facilitate the speed transition. For example, during a speed increase boost stage(s) 12, inlet guide vanes 38 and bleed valve(s) 40 may be adjusted to decrease the resistance on boost stage(s) 12 and thereby assist in increasing the rotational speed of boost stage(s) 12. Conversely, during a speed decrease of boost stage(s) 12, inlet guide vanes 38 and bleed valves(s) 40 may be adjusted to increase the resistance on boost stage(s) 12 and thereby assist in braking boost stage(s) 12. In some aircraft applications, it may be desirable that the transition of rotational speed of boost stage(s) 12 between the first speed and the second speed be performed during a relatively short period of time (e.g. around 2 seconds).

The methods described above may be executed and controlled by a control system of engine 10 and may be initiated in response to an action (e.g. request or command) by an operator of engine 10 such as a pilot of an aircraft for example. The control system of engine 10 may include or form part of a Full Authority Digital Engine Control (FADEC) which may, for example, comprise one or more digital computer(s) or other data processors, sometimes referred to as electronic engine controller(s) (EEC) and related accessories that control at least some aspects of performance of engine 10. The control system may include one or more microcontrollers or other suitably programmed or programmable logic circuits.

The above description is meant to be exemplary only, and one skilled in the relevant arts will recognize that changes may be made to the embodiments described without departing from the scope of the invention disclosed. For example, coupling device(s) 20 may be configured differently than the exemplary configuration of FIGS. 2A-2C. For example, both energy transfer paths via clutch A and clutch B may each comprise gear(s) 28 that provide a different speed ratio (e.g. reducing or augmenting) between boost stage(s) 12 and power turbine shaft(s) 18 so as to achieve the desired speed ratios via clutch A and clutch B. Alternatively, in various embodiments, coupling device(s) 20 may only include a single clutch, such as clutch A for example, while gear(s) 28 may be configured to provide two or more energy transfer paths at different speed ratios.

Still other modifications which fall within the scope of the present invention will be apparent to those skilled in the art, in light of a review of this disclosure, and such modifications are intended to fall within the appended claims.

What is claimed is:

1. A method for changing a rotational speed of a compressor boost stage driven by at least one power turbine of a gas turbine engine relative to a speed of the at least one power turbine, the method comprising:
    driving the boost stage at a first rotational speed corresponding to a first speed ratio between the boost stage and the at least one power turbine via coupling between the boost stage and the at least one power turbine;
    decoupling the boost stage from the at least one power turbine;
    changing the rotational speed of the boost stage from the first rotational speed to a second rotational speed substantially corresponding to a second speed ratio between the boost stage and the at least one power turbine;

re-coupling the boost stage to the at least one power turbine at the second speed ratio; and driving the boost stage at the second rotational speed via coupling between the boost stage and the at least one power turbine.

2. The method as defined in claim 1, comprising transferring energy to the boost stage to cause the rotational speed of the boost stage to increase in relation to the at least one power turbine while the boost stage is decoupled from the at least one power turbine.

3. The method as defined in claim 1, comprising adjusting at least one of inlet guide vanes and a bleed valve to adjust a resistance on the boost stage.

4. The method as defined in claim 2, comprising extracting pressurized air from a core section of the turbine engine and using the pressurized air to drive an air turbine coupled to the boost stage to cause the rotational speed of the boost stage to increase in relation to the at least one power turbine.

5. The method as defined in claim 4, comprising pressurizing the air extracted from the core section prior to driving the air turbine.

6. The method as defined in claim 1, comprising braking the boost stage to cause the rotational speed of the boost stage to decrease in relation to the at least one power turbine while the boost stage is decoupled from the at least one power turbine.

\* \* \* \* \*